United States Patent [19]
Sugihara et al.

[11] 3,805,088
[45] Apr. 16, 1974

[54] POWER SUPPLY CIRCUIT

[75] Inventors: Yasuhiro Sugihara, Katano; Mitsuo Isobe, Moriguchi, both of Japan

[73] Assignee: Matsushita Electric Industrial Co., Ltd., Osaka, Japan

[22] Filed: Nov. 7, 1972

[21] Appl. No.: 304,541

[30] Foreign Application Priority Data
Nov. 8, 1971   Japan.............................. 46-89334

[52] U.S. Cl. ............................. 307/150, 317/33 VR
[51] Int. Cl. .............................................. H02h 7/00
[58] Field of Search......... 307/150, 202; 323/22 SC; 317/33 SC, 33 VR

[56] References Cited
UNITED STATES PATENTS
| | | | |
|---|---|---|---|
| 3,262,046 | 7/1966 | Clarke et al. | 323/22 SC |
| 3,564,388 | 2/1971 | Nolf | 323/22 SC |
| 3,726,999 | 4/1973 | Dreiske | 323/22 SC |

Primary Examiner—Robert K. Schaefer
Assistant Examiner—M. Ginsburg
Attorney, Agent, or Firm—Stevens, Davis, Miller & Mosher

[57] ABSTRACT

A power supply circuit for use in television receiver sets and the like and of the type where an a-c source voltage is rectified for impression upon a thyristor whose output is smoothed for coupling to a load. The firing phase of the thyristor is normally controlled in accordance with the voltage supplied to the load for voltage stabilization. In addition, the thyristor is rendered into the non-conduction state upon detection of an excessive load current due to an accident in the load, whereby the otherwise possible rupture of many circuit elements due to excessive current may be reliably prevented. When the normal state of the load has been restored, the power supply circuit may be brought into its normal operative state in a simple way.

5 Claims, 7 Drawing Figures

POWER SUPPLY CIRCUIT

This invention relates to power supply circuits for use in television receiver sets and the like. More particularly, it relates to a power supply circuit, which includes a thyristor, and whose state is controlled according to the load state.

The thyristor is known to be superior in switching characteristics and has large voltage and current capacities. For these reasons, the thyristor has been extensively used in d-c stabilized power sources for electronic apparatus. However, since the thyristor has extremely large voltage and current capacities compared to a load circuit including semiconductor elements such as transistors, where a d-c stabilized power source having the thyristor is used to supply power to the load circuit including transistors, the thyristor would continue to be in its normal operative state even if an abnormal state of the load takes place, so that it is likely to cause damage or rupture to other circuit elements. To avoid this, it has been usual in prior-art thyristor power circuit to insert a fuse between the rectifying circuit and an a-c source, so that upon occurrence of a short-circuit accident in the load the fuse may be broken to protect the load circuit elements.

In the above prior-art construction, however, the fuse should be replaced every time it is broken. Therefore, the above prior-art thyristor power circuit can find only very limited use, and it is not suitable as a power supply circuit for television receiver sets and the like. Also, in order to prevent frequent breakage of the fuse, it is essential to use a fuse of a large capacity. This is not suitable as a means to prevent excessive power from being supplied to the load.

An object of the invention is to provide a power supply circuit, which can overcome the above drawbacks inherent in the prior-art power supply circuits and can be reliably rendered inoperative upon occurrence of an accident in the load by the action of an electronic element.

Another object of the invention is to provide a power supply circuit, whose operation can be resumed in a simple way when the normal state of the load has been recovered.

A further object of the invention is to provide a power supply circuit, which is simple in construction and inexpensive.

A feature of the invention resides in the power supply circuit, which comprises a rectifier to rectify an a-c voltage, a thyristor having the anode or cathode thereof connected to an output terminal of said rectifier, the cathode or anode of said thyristor being connected through a smoothing circuit to a load, means to receive the output of said rectifier and produce a voltage signal, the slope of said voltage signal changing periodically with time, means to compare said voltage signal and the voltage coupled to the load for producing a phase controlled pulse signal impressed between gate and cathode of said thyristor, means to discriminate whether or not the amplitude of the current flowing through the load is greater than a predetermined value, and means to check the generation of said pulse signal in response to an output signal from said discriminating means.

In order for the invention to be fully understood, description will now be made in connection with the accompanying drawings, in which.

Figure 1:
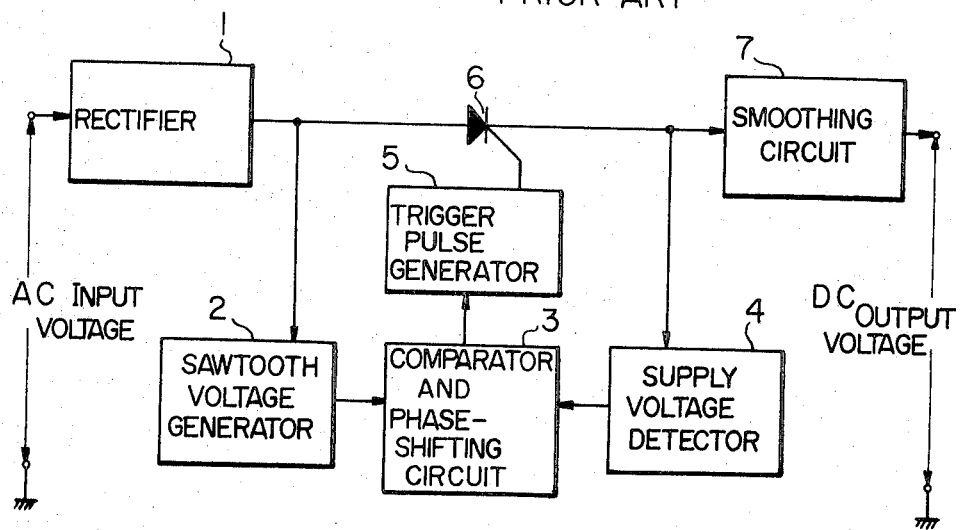
FIG. 1 is a block diagram showing a prior-art power supply circuit.

FIG. 1 shows, in block form, a prior-art example of the power supply circuit using a thyristor. It comprises a rectifier 1, a sawtooth voltage generator 2, a comparator and phase shifting circuit 3, a supply voltage detector 4, a trigger pulse generator 5, a thyristor 6 with the gate thereof connected to the trigger pulse generator 5, and a smoothing circuit 7. In such prior-art power supply circuit, a fuse is usually inserted between the rectifier 1 and an a-c source so that upon occurrence of an accident in the load it may be broken to protect the circuit elements.

Figure 2:
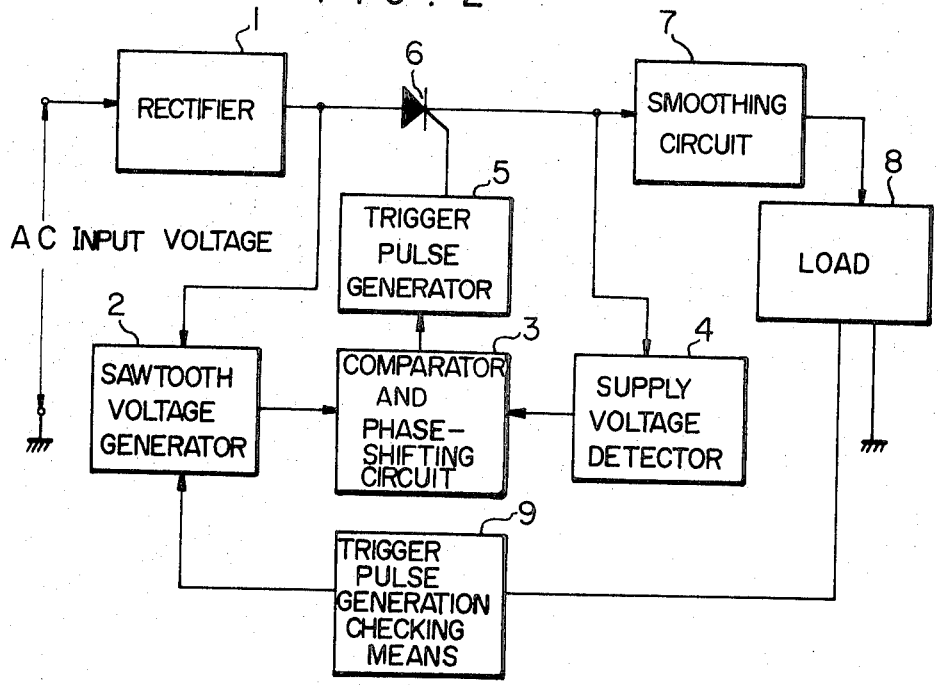
FIG. 2 is a block diagram showing an embodiment of the power supply circuit according to the invention.

FIG. 2 outlines an embodiment of the invention. The illustrated system includes, in addition to the system of FIG. 1, a load circuit 8 and a circuit 9 connected between the load circuit 8 and the sawtooth voltage generator 2. The circuit 9 acts to detect an accident in the load circuit 8, whereupon it renders the sawtooth voltage generator 2 inoperative to cut off the thyristor 6, thereby protecting the load circuit.

Figure 3:
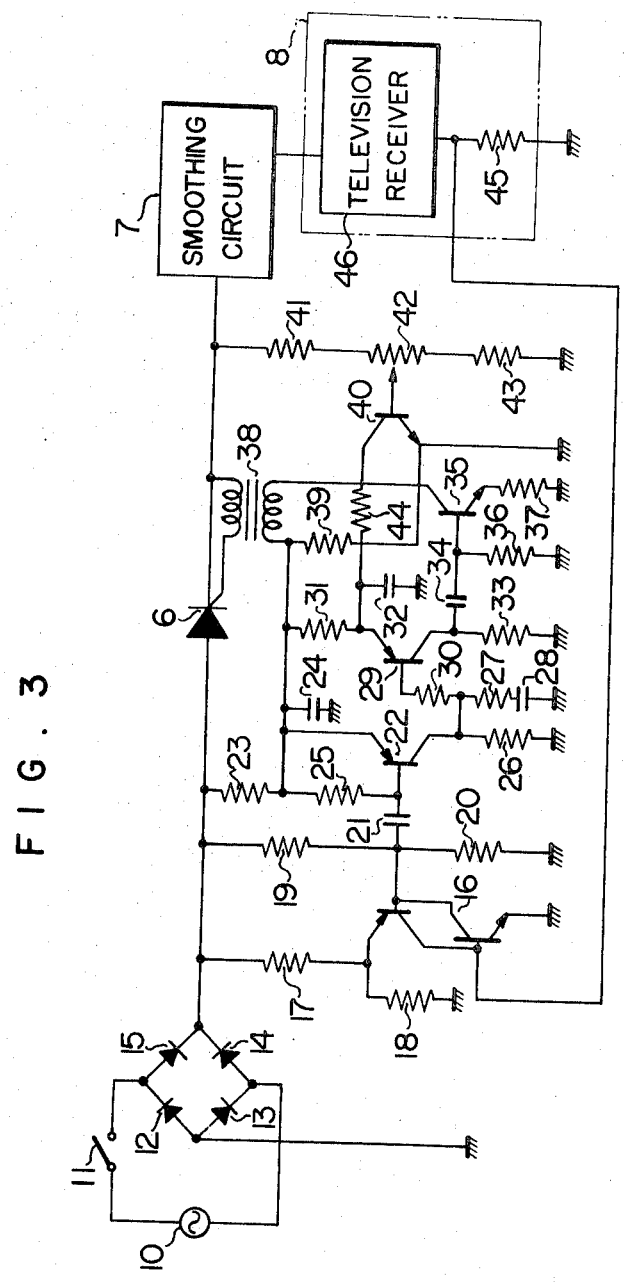
FIG. 3 is a circuit diagram, partly in block form, showing the circuit construction of the embodiment of FIG. 2.

FIG. 3 shows in detail the circuit construction of the system of FIG. 2. Referring to the Figure, reference numeral 10 designates an a-c source, and numeral 11 a power source switch. Numerals 12, 13, 14 and 15 designate diodes, which constitute a bridge rectifier. Numeral 16 designates a bi-stable element. Resistors 17 and 18 constitute a voltage divider to provide a bias voltage to the anode of the bi-stable element 16. Resistors 19 and 20 constitute a voltage divider to couple a parabolic voltage to the collector of the element 16. The junction between the resistors 19 and 20 is connected through a coupling capacitor 21 to a sawtooth voltage generation transistor 22, which has its emitter connected to a smoothing circuit of a resistor 23 and a capacitor 24 and also through a base bias resistor 25 to its base and its collector connected to a load consisting of resistors 26 and 27 and a capacitor 28. A transistor 29 acts such that a signal impressed upon its emitter and a signal impressed upon its base are compared. It has its base connected to a resistor 30, its emitter connected to a resistor 31 and also to a smoothing capacitor 32 and its collector connected to a load resistor 33. The collector of the transistor 29 is also connected through a coupling capacitor 34 to a transistor 35 for generating trigger pulses to trigger the thyristor 6. The base and emitter of the transistor 35 are connected to respective resistors 36 and 37. The collector of the transistor 35 is connected to the primary of a transformer 38, whose secondary is connected between the gate and cathode of the thyristor 6 for trigger pulse impression therebetween. The primary of the transformer 38 is connected in series with a resistor 39 to the emitter of a transistor 40, which serves to detect the output voltage of the thyristor 6, and whose base is connected to a voltage divider consisting of resistors 41, 42 and 43. The collector of the transistor 40 is connected through a resistor 44 to the emitter of the transistor 29. Numeral 46 designates a television receiver circuit, and it is in series with an accident detection resistor 45.

Figure 4:
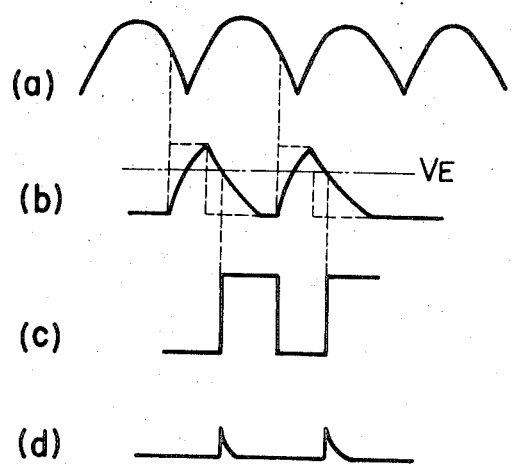
FIG. 4 is a waveform chart showings waveforms appearing at various parts of the circuit of FIG. 3.

In operation, when the power source switch 11 is closed, the a-c source voltage is full-wave rectified through the bridge rectifier into a parabolic voltage as shown in FIG. 4a. The parabolic voltage thus produced is coupled through the resistor 19, which constitutes a voltage divider with the resistor 20, and through the capacitor 21 to the base of the transistor 22. With this input signal, the transistor 22 is driven on and off so that a sawtooth voltage as shown in FIG. 4b appears at its collector. This sawtooth voltage is coupled to the base of the transistor 29. Meanwhile, the voltage appearing at the output terminal of the thyristor 6 is impressed, after voltage division through the voltage divider of resistors 41, 42 and 43, upon the base of the transistor 40 for amplification, and the amplified voltage is smoothed through the capacitor to obtain a d-c voltage, which is coupled to the emitter of the transistor 29. Thus, the transistor 29 is on-off switched as the sawtooth voltage impressed upon its base and the d-c voltage impressed upon its emitter are compared one with another, thus producing a rectangular output as shown in FIG. 4c. This output is differentiated through the differentiating circuit including the transistor 35, and the resultant output is coupled through the transformer 38 to the thyristor 6 as a trigger pulse as shown in FIG. 4d for triggering the thyristor.

When the television receiver 46 is in its normal operative state, with a predetermined level of current passing through it, a predetermined level of voltage is detected by the resistor 45. The above predetermined level of voltage is set lower than a voltage which must be impressed on the base B of the bi-stable element 16 to render it conductive. Thus, in the above state the bi-stable element 16 remains in the OFF state and has no effects, and the normal voltage stabilizing operation continues.

When the current through the television receiver 46 becomes excessive due to an accident therein, the terminal voltage across the resistor 45 is increased to ultimately render the bi-stable element 16 conductive. As a result, the potential on the junction between the resistors 19 and 20 is reduced to zero, so that the switching operation of the transistor 22 is stopped to stop the generation of trigger pulse for triggering the thyristor 6. The thyristor 6 is thus rendered and held in the OFF state.

As the result of rendering the thyristor 6 OFF, the terminal voltage across the resistor 45, and hence voltage impressed upon the base B of the bi-stable element 16, vanishes. However, the bi-stable element 16 remains ON unless the power source switch 11 is opened. To resume the operation of the power supply circuit, therefore, the power supply switch 11 should be opened once and then re-closed. Upon re-closure of the switch 11, however, the bi-stable element 16 will again be immediately rendered conductive to cut off the thyristor so long as the load circuit 8 is in an abnormal state. If the normal state of the television receiver 46 has been recovered at this instant, the bi-stable element 16 this time is OFF since the terminal voltage developed across the resistor 45 is too low to render it conductive, so that the parabolic voltage appears at the junction between the resistors 19 and 20, that is, the collector C of the bi-stable element 16, to on-off drive the saw-tooth voltage generation transistor 22 and the transistor 29 so as to have the trigger pulse generator circuit including the transistor 35 generate trigger pulses to trigger the thyristor 6.

As has been shown, the power supply circuit according to the invention can be automatically rendered inoperative upon occurrence of an accident in the load, so that it is possible to prevent rupture and burning of the load circuit elements. Also, since no fuse is used, there is no need of replacing any fuse after occurrence of an accident in the load.

While in the preceding embodiment of FIG. 3 the voltage divider of resistors 41, 42 and 43 are provided before the smoothing circuit 7, it may be provided after the smoothing circuit 7 as well.

Figure 5:
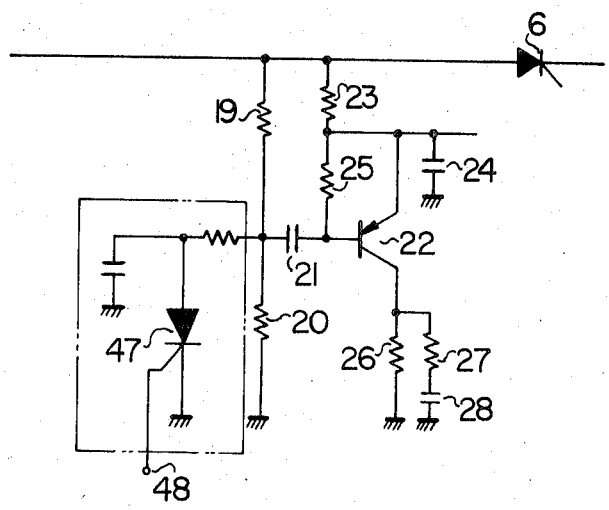
FIG. 5 is a fragmentary circuit diagram showing another embodiment of the invention.

FIG. 5 shows another embodiment, which is different from the previous embodiment of FIG. 3 in the construction of the circuit 9 shown in FIG. 2. In other words, it is different from the FIG. 3 embodiment in a part enclosed within a chain line rectangle in FIG. 5. As is shown, in place of the bi-stable element 16 a thyristor 47 functioning in a similar way is employed. This thyristor 47 can be rendered conductive by a signal impressed on a terminal 48 upon occurrence of an accident in the load to prevent the parabolic signal from being added to the transistor 22 so as to prevent impression of a trigger signal upon the thyristor 6. Also, normally it remains OFF, permitting the impression of the parabolic voltage upon the base of the transistor 22 for the normal voltage stabilizing operation of the power supply circuit.

Figure 6:
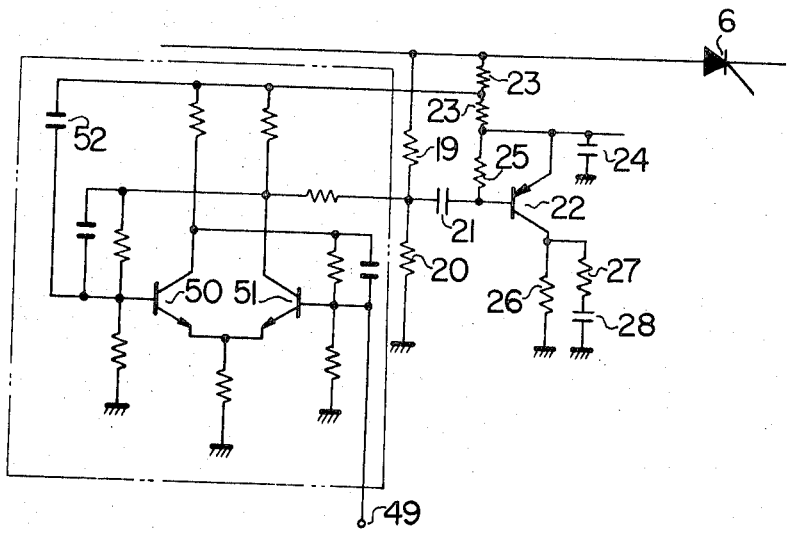
FIG. 6 is a fragmentary circuit diagram showing a further embodiment of the invention.

FIG. 6 shows a further embodiment having a different construction for the circuit 9. Referring to the Figure, numeral 49 designates a terminal, upon which a trigger signal is impressed upon occurrence of an accident in the load circuit, numerals 50, 51 designate transistors constituting a bi-stable multivibrator, and numeral 52 designates a capacitor for producing a reset pulse to reset the multi-vibrator upon closure of the power supply switch.

In this circuit, in the normal state without any trigger pulse appearing at the terminal 49, the transistor 51 remains OFF, permitting the parabolic voltage to be impressed upon the base of the transistor 22 for the normal voltage stabilizing operation.

Upon appearance of a trigger pulse at the terminal 49 due to an accident in the load circuit, the transistor 51 is triggered. This state is equivalent to that which results by connecting a large load to the connection between the resistors 19 and 20. As a result, the parabolic voltage impressed on the base of the transistor 22 is reduced so that sufficient switching action of this transistor can no longer be maintained. Thus, the pulse signal to be added to the thyristor 6 vanishes, and the power supply circuit is rendered OFF or inoperative.

Figure 7:
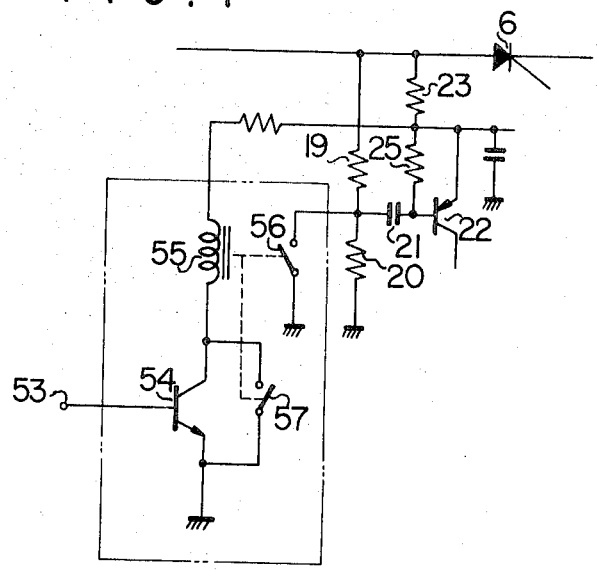
FIG. 7 is a fragmentary circuit diagram showing still another embodiment of the invention.

FIG. 7 shows still another embodiment. In this embodiment, a transistor 54 is triggered by a signal appearing at a terminal 53 upon occurrence of an accident in the load circuit, thereby activating a relay 55 for self-sustention thereof through relay switches 56 and 57 and prevention of the parabolic voltage from being impressed upon the base of the transistor 22.

We claim:

1. A power supply circuit comprising a rectifier to rectify an AC voltage, a smoothing circuit having its input connected to the output of said rectifier through a first thyristor, a machinery circuit such as a television receiver circuit to which the output of said smoothing circuit is applied, a switching element for periodically performing a switching operation by the output of said rectifier, means including a capacitor for integrating the output of said switching element to generate a sawtooth voltage, means for comparing the sawtooth voltage with a voltage applied to the machinery circuit to generate a phase controlled pulse and to apply this pulse across the gate and the cathode of said first thyristor, means for detecting whether or not a current passing through said machinery circuit is larger than a predetermined value and means for preventing the output of said rectifier from being applied to said switching element, whereby when the current passing through said machinery circuit exceeds said predetermined value the operation of said switching element is stopped and thereby the generation of a pulse to be applied across the gate and the cathode of said first thyristor is blocked.

2. The power supply circuit according to claim 1, which includes a voltage divider comprising two series resistors to divide the output voltage of said rectifier, a transistor on-off driven for switching action by a voltage appearing at the voltage division point between said two series resistors and being impressed upon the base of said transistor, said capacitor being connected to the collector of said transistor, a bi-stable element having a collector connected to said voltage division point, and a current discriminating resistor connected in series with said machinery circuit, the terminal voltage across said current discriminating resistor being impressed upon the base of said bi-stable element.

3. The power supply circuit according to claim 1, which includes a voltage divider comprising two series resistors to divide the output voltage of said rectifier, a transistor on-off controlled for switching action by a voltage appearing at the voltage division point between said two series resistors and being impressed upon the base of said transistor, said capacitor being connected to the collector of said transistor, a second thyristor having the anode-cathode path thereof connected between said voltage division point and ground, and a current discriminating resistor connected in series with said machinery circuit, the terminal voltage across said current discriminating resistor being impressed upon the gate of said second thyristor.

4. The power supply circuit according to claim 1, which includes a voltage divider comprising two series resistors to divide the output voltage of said rectifier, a transistor on-off controlled for switching action by a voltage appearing at the voltage division point between said two series resistors and being impressed upon the base of said transistor, said capacitor being connected to the collector of said transistor, a bi-stable multivibrator adapted to be reset upon closure of a power source switch provided before said rectifier, said multivibrator having an output terminal connected to said voltage division point, and a current discriminating resistor connected in series with said machinery circuit, the terminal voltage across said current discriminating resistor being impressed upon a set terminal of said multivibrator.

5. The power supply circuit according to claim 1, which includes a voltage divider comprising two series resistors to divide the output voltage of said rectifier, a transistor on-off controlled for switching action by a voltage appearing at the voltage division point between said two series resistors and being impressed upon the base of said transistor, said capacitor being connected to the collector of said transistor, a self-sustaining type relay including a relay coil and a first relay switch connected to said voltage division point and a a second relay switch in series with said relay coil and connected to ground, and a current discriminating resistor connected in series with said machinery circuit, the terminal voltage across said current discriminating resistor being used to activate said self-sustaining type relay.

* * * * *